[19] United States Patent
Yamakawa et al.

[11] 4,271,801
[45] Jun. 9, 1981

[54] INTERNAL COMBUSTION ENGINE WITH TWIN INTAKE PORTS FOR EACH CYLINDER

[75] Inventors: Yoshio Yamakawa, Toyota; Toshikazu Toyoda, Numazu; Hidetaka Nohira, Mishima, all of Japan

[73] Assignee: Toyota Jidosha Kogyo Kabushiki Kaisha, Toyota, Japan

[21] Appl. No.: 949,238

[22] Filed: Oct. 6, 1978

[30] Foreign Application Priority Data

Oct. 12, 1977 [JP] Japan ................................. 52/121551

[51] Int. Cl.³ ............................................ F02M 25/06
[52] U.S. Cl. ...................................... 123/432; 123/308
[58] Field of Search ...................... 123/127, 75 B, 432, 123/308; 261/23 A, 50 A

[56] References Cited

U.S. PATENT DOCUMENTS

| 2,028,585 | 1/1936 | Blake | 123/119 R |
| 2,698,613 | 1/1955 | Jayersberger | 123/119 R |
| 3,903,211 | 9/1975 | Kono | 261/23 A |
| 4,062,334 | 12/1977 | Toda | 261/23 A |
| 4,064,850 | 12/1977 | Nakagawa | 123/75 B |
| 4,073,271 | 2/1978 | Yamazaki | 123/75 B |
| 4,086,885 | 5/1978 | Noguchi | 123/75 B |
| 4,194,474 | 3/1980 | Endo | 123/75 B |

Primary Examiner—Ronald H. Lazarus
Attorney, Agent, or Firm—Kenyon & Kenyon

[57] ABSTRACT

An internal combustion engine includes a duplex carburetor, an engine cylinder, a pair of primary and secondary venturis and an intake manifold connected between the cylinder and the carburetor, the manifold having a common chamber located downstream of the venturis and a pair of primary and secondary branch intake passages opening to the cylinder through a pair of intake ports, respectively. There is a valve in the secondary intake passage for controlling the flow of air-fuel mixture therethrough, the valve being opened by a control mechanism including a vacuum servo which receives a vacuum signal from a port opening to the secondary venturi for actuating link means connected to the control valve. The secondary passage is normally blocked and is only opened when the engine rotates at high speed under heavy load.

8 Claims, 3 Drawing Figures

_4,271,801_

INTERNAL COMBUSTION ENGINE WITH TWIN INTAKE PORTS FOR EACH CYLINDER

BACKGROUND OF THE INVENTION

1. Field of the Invention

The present invention relates to an internal combustion engine with a cylinder having a pair of intake ports connected respectively through a pair of manifold passages to a duplex carburetor.

2. Prior Art

Devices for lean air-fuel mixture combustion and exhaust gas recirculation (EGR) have been employed for purifying exhaust gases or increasing mileage with a view to saving energy. Air-fuel mixtures to be burnt with such devices, however, are low in combustibility and unstable. To improve their combustibility, there have been proposed a pair of primary and secondary intake ports opening to an engine cylinder so as to supply air-fuel mixture only through the primary intake port when the engine rotates at low speed under light load. The mixture thus enters through a relatively restricted area across one of the ports, causing swirls in the cylinder that help increase the rate of combustion.

The air-fuel mixture that flows through the secondary intake port is controlled by a valve disposed in a secondary intake passage leading to the secondary intake port, the valve being opened and closed by a mechanism that is energizable by a vacuum signal available at the intake passage. Such conventional mechanisms have the disadvantage that when the engine rotates at low speed under heavy load, or in the low intake flow zone, the throttle valve is opened, making the pressure inside the intake passage substantially atmospheric. Then, the control valve in the secondary intake passage is forced to open despite the low speed of rotation of the engine. This results in an increased intake area and a reduced velocity of flow of the mixture into the combustion chamber. Accordingly, no swirls are created within the cylinder, with the results that the mixture combustibility is impaired, purification of exhaust gases fails, and reduced fuel consumption is not obtained.

SUMMARY OF THE INVENTION

According to the invention, a vacuum sensing port opens to at least one of the venturis of a duplex carburetor and leads through a passage to a vacuum servo, which upon energization actuates link means to open a control valve disposed in one of the branch passages of an intake manifold and normally closing said one of the branch passages.

An object of the present invention is to provide an internal combustion engine with a cylinder having a pair of intake ports, the engine including control means for maintaining the control valve closed in a secondary intake passage during the period of low intake of air fuel mixture.

Many other features of the present invention will become manifest to those in the art upon making reference to the detailed description and the accompanying sheets of drawings in which preferred structural embodiments incorporating the present invention are shown by way of illustrative example.

DETAILED DESCRIPTION OF THE EMBODIMENTS

Figure 1:
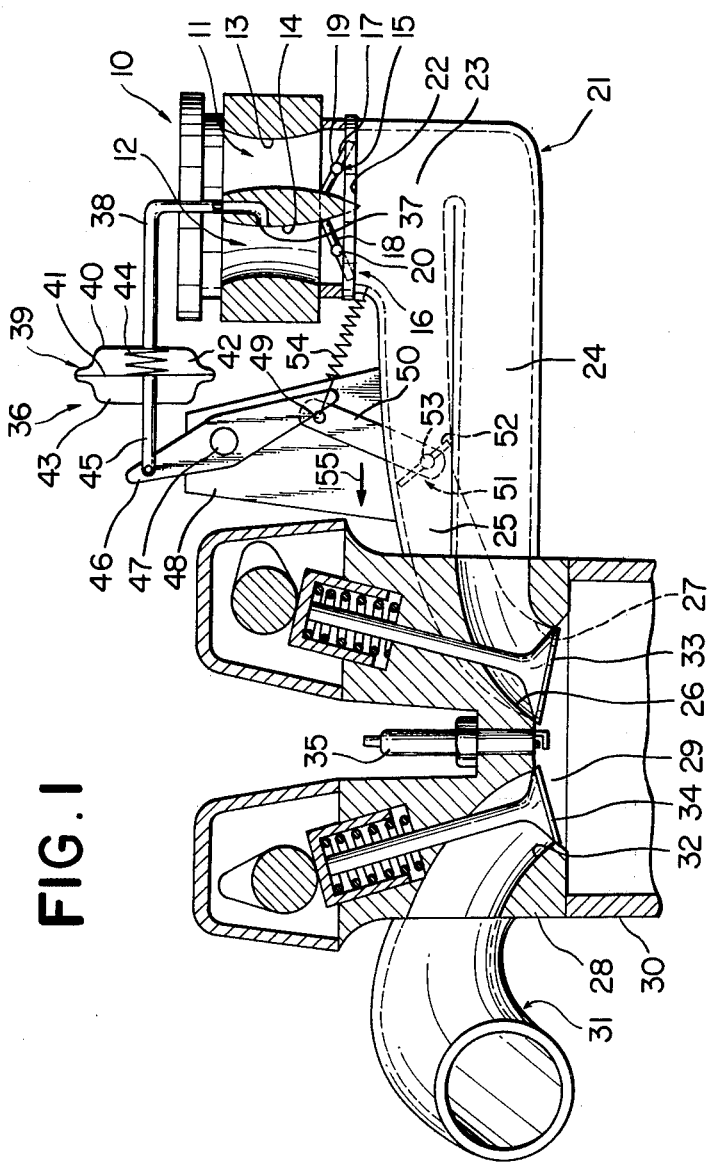
FIG. 1 is a fragmentary side elevational view, partly in cross section, of an internal combustion engine according to a first embodiment of the invention.

The present invention is particularly useful when embodied in an internal combustion engine having a duplex carburetor such as is schematically shown in FIG. 1, generally indicated by the numeral 10.

The duplex carburetor 10 includes a pair of primary and secondary venturis 11, 12 having a pair of constricted middle sections or throats 13, 14 respectively. Beneath the venturis 11, 12, there are a pair of primary and secondary throttle valves 15, 16 comprising a pair of valve plates 17, 18 fixed respectively on shafts 19, 20 rotatably mounted in the sidewalls of the carburetor body.

An intake manifold 21 is connected at its intake end 22 to the carburetor 10 and has a common chamber 23 located downstream of and communicating with the primary and secondary venturis 11, 12. The intake manifold 21 also includes a pair of primary and secondary intake passages 24, 25 located downstream of and branched from the common chamber 23, the passages 24, 25 having a pair of primary and secondary inlet ports 26, 27, respectively, disposed in a cylinder head 28 and opening to a combustion chamber 29 above a cylinder 30. An exhaust manifold 31 also has a discharge port 32 located in the cylinder head 28 and communicating with the combustion chamber 29. The cylinder head 28 contains a pair of inlet valves 33 (only one shown) for opening and closing the inlet ports 26, 27, an exhaust valve 34 for opening and closing the discharge port 32, and a spark plug 35 for igniting compressed air-fuel mixture in the combustion chamber 29.

There is a control mechanism 36 for opening and closing the auxiliary inlet passage 25, and it includes a vaccum sensing port 37 opening to the secondary venturi 12 at its throat 14, the port 37 leading through a passage or conduit 38 to a vacuum servo 39 that is energizable upon receipt of a signal vacuum from the port 37. The servo 39 comprises a hollow outer shell 40 and a flexible diaphragm 41 that divides the shell 40 into a signal vacuum chamber 42 and an air chamber 43. A compression spring 44 is disposed in the chamber 42 and acts between the shell 40 and the diaphragm 41. Connected to the side of the diaphragm 41 that is remote from the spring 44 is a rod or plunger 45 pivotally connected to one end of a lever 46 that is pivotally mounted at its middle portion on a pivot 47 fixed to a bracket 48. The other end of the lever 46 engages a pin 49 on one end of a lever 50, the other end of which fixedly supports a control valve 51 having a valve plate 52 and a valve shaft 53 rotatably mounted in the secondary intake passage 25. A tension spring 54 acts between the manifold 21 and the pin 49 on the lever 50 so as to normally bias the valve 51 in a direction closing the secondary intake passage 25.

During operation of the engine at low speed of rotation under light load, air flows at a low rate through the primary venturi 11, and the secondary throttle valve 16 remains closed. Consequently, no air flows through the secondary venturi 12, with no signal vacuum developed therein, and the control valve 51 in the auxiliary intake passage 25 is maintained in the closed position. Therefore, air-fuel mixture passes entirely through the primary intake passage 24 and enters the combustion chamber 29 only through the primary intake port 26. An intake area is thus restricted and relatively small, enabling large swirls to be developed in the combustion chamber 29, to thereby help lean or other difficult-to-combust mixtures to burn rapidly and stably. This improves combustibility, purifies exhaust gases, and saves fuel consumption.

When the engine is rapidly accelerated from the low or medium speed of rotation zone, such as 2,500 rpm for example, the secondary throttle valve 16 becomes opened. At this time, conventional control valves that are manifold vacuum controlled would be opened, as the pressure in the intake passage is substantially atmospheric. Further, prior control valves that are mechanically ganged with the primary throttle valve 15 would also be forced to open. According to the invention, however, the control valve 51 is opened and closed by the use of a signal vacuum in the secondary venturi 12. Since the rapid acceleration from the low or medium speed of rotation zone does not increase the flow rate in the secondary venturi 12, with no vacuum produced at the port 37, the control valve 51 is kept closed, and the air-fuel mixture flows only through the primary intake port 26. Accordingly, even when the engine is suddenly accelerated from the low or medium speed of rotation zone, air-fuel mixture swirls continue to develop inside the combustion chamber 29, thereby improving combustibility of the mixture.

As the engine rotates at progressively higher speed under progressively heavier load, the flow rate through the secondary venturi 12 becomes high enough, and a vacuum is developed therein, the vacuum signal acting through the passage 38 on the diaphragm 41, which is then actuated to turn the lever 46 against the force from the spring 54, whereupon the lever 50 is angularly moved in the direction of the arrow 55, thereby opening the control valve 51. In the heavy load, high speed zone, therefore, the air-fuel mixture is supplied through both the primary and secondary intake ports 26, 27. The intake area is thus increased, and the resistance to mixture intake is reduced, assuring good engine performance in such wide-open throttle operation.

Figure 2:
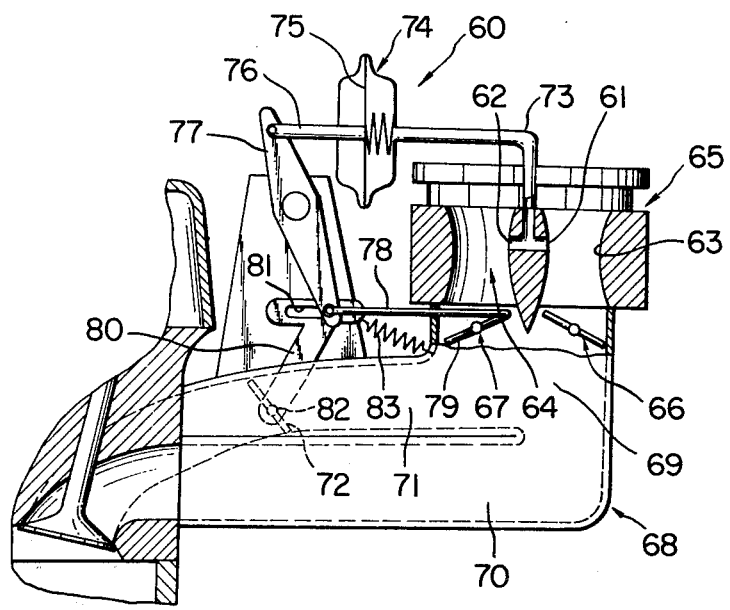
FIG. 2 is a fragmentary side elevational view, partly in cross section, of an internal combustion engine of a second embodiment.

FIG. 2 illustrates a second embodiment in which a control mechanism 60 has a pair of vacuum sensing ports 61, 62 that open to a pair of primary and auxiliary venturis 63, 64, respectively, of a duplex carburetor 65, there being a pair of primary and secondary throttle valves 66, 67 disposed downstream of the primary and secondary venturis 63, 64, respectively. An intake manifold 68 has a common chamber 69 located downstream of the carburetor 65 and a pair of primary and secondary branch passages 70, 71, the secondary passage 71 being normally closed by a control valve 72 which is opened and closed by the control mechanism 60. A conduit 73 connects the vacuum sensing ports 61, 62 to a vacuum servo 74 containing a flexible diaphragm 75 to which there is secured a plunger 76 pivotally connected to one end of a pivotable lever 77, the other end of which is coupled through a link 78 to the plate 79 of the throttle valve 67. A lever 80 is pivotally mounted on a shaft 82 of the control valve 72, the lever 80 having a slot 81 in which there is loosely received a projection (not shown) on the lever 77. Thus, the lever 80 is coupled to the lever 77 and the throttle valve 67 through a lost-motion connection. The lever 80 is urged by a tension spring 83 in a direction to normally close the control valve 72.

With this arrangement, combined vacuum signals at the ports 61, 62 can be utilized to actuate the secondary throttle valve 67. Further, the opening operation of the control valve 72 is initiated a predetermined interval of time after actuation of the secondary throttle valve 67. The throttle valve 67 and the control valve 72 can be operated under the control of the mechanism 60, an advantage that makes the overall arrangement quite simpler than heretofore.

Figure 3:
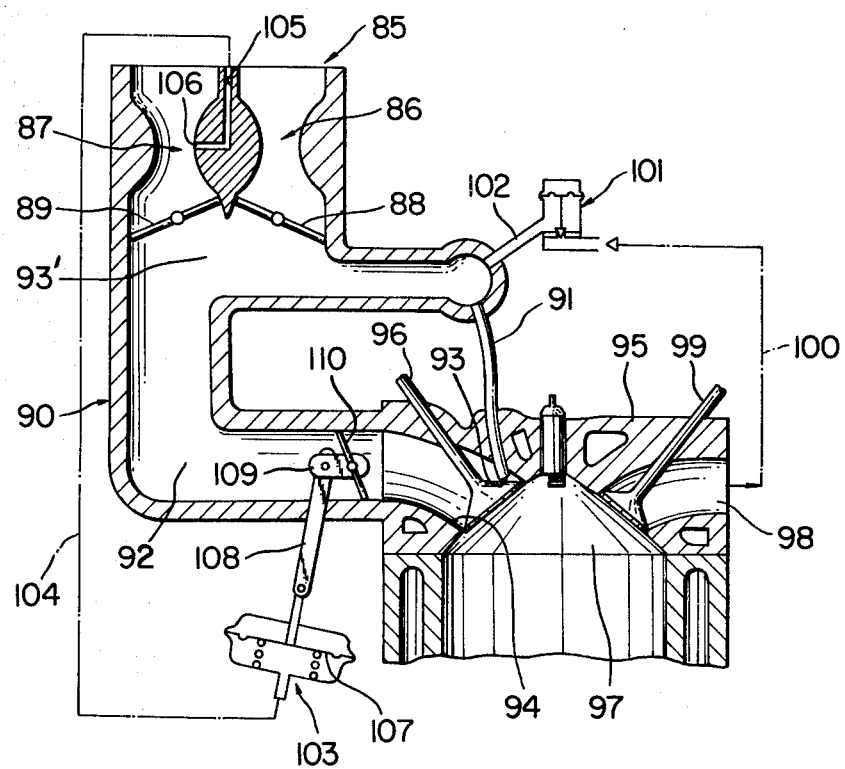
FIG. 3 is a fragmentary vertical cross-sectional view of an engine in accordance with a third embodiment.

According to a third embodiment shown in FIG. 3, a duplex carburetor 85 includes a pair of primary and secondary venturis 86, 87, below which there are disposed a pair of primary and secondary throttle valves 88, 89, respectively. An intake manifold 90 has a primary intake passage 91 and a secondary intake passage 92, both branched from a common chamber 93' located downstream of the venturis 86, 87. The primary intake passage 91 has a primary intake port 93 opening into the secondary intake passage 92 adjacent to its secondary intake port 94 in a cylinder head 95. The inlet port 93 is directed so as to guide air-fuel mixture to flow along the cone-shaped surface of the intake valve 96, and opens tangentially with respect to the circumference of the combustion chamber 97, so as to develop mixture swirls inside the combustion chamber 97. The opening area of the primary intake port 93 is in the range between 1/5 and 1/10 of that of the secondary intake port 94, in order to increase the flow rate of the air-fuel mixture entering the combustion chamber 97. Exhaust gases discharged from the combustion chamber 97 through an exhaust duct 98 during an opening stroke of an exhaust valve 99 are partly led via a line 100 to an EGR valve 101. The EGR valve 101 is held in communication with the primary intake passage 91 through a conduit 102. A vacuum servo 103 is actuatable when it is supplied with a vacuum signal through a line 104 leading from a passage 105 having a vacuum sensing port 106 opening to the secondary venturi 87. The servo 103 includes a flexible diaphragm 107 connected through a link 108 to a lever 109 fastened to a control valve 110 disposed in the secondary intake passage 92.

During light load, low-speed rotation of the engine, no vacuum is produced at the port 106, and the servo 103 remains inoperative, the control valve 110 blocking the secondary intake passage 92. Accordingly, air-fuel mixture flows into the combustion chamber 97 only through the primary intake port 93. The primary intake port 93 is relatively small in diameter, and opens tangentially with respect to the circumference of the combustion chamber 97, so that the mixture creates powerful swirls in the combustion chamber 97 during an intake stroke. With the primary inlet port 93 directed to allow the air-fuel mixture to move along the inclined, cone-shaped surface of the intake valve 96, the primary intake port 93 can also decrease losses due to the resistance of the intake valve 96, thereby maintaining adequate momentum of the mixture to cause strong swirls.

In the heavy-load, high-speed rotation mode of operation of the engine, the air flowing at high speed develops a vacuum in the secondary venturi 87. This vacuum actuates the diaphragm 107, and the air-fuel mixture flows also through the secondary intake port 94, thus insuring good engine performance in the high-load, high-speed rotation zone.

Although various minor modifications may be suggested by those in the art, it should be understood that we wish to embody within the scope of the patent warranted hereon all such embodiments as reasonably and properly come within the scope of our contribution to the art.

We claim as our invention:

1. An internal combustion engine comprising:
   (a) a cylinder;
   (b) a duplex carburetor having a pair of venturis, one of said venturis having significant air flow therethrough only at high engine speed and load;
   (c) an intake manifold connected between said cylinder and said duplex carburetor, said manifold including a chamber located downstream of and communicating with said venturis, and a pair of passages, branched from said chamber and having a pair of intake ports, respectively, opening to said cylinder;
   (d) a valve normally closing one of said passages; and
   (e) control means energizable in response to a vacuum signal from said one of said venturis for actuating said valve to open said one of said passages only during operation of the engine at high speed of rotation under heavy load, whereby the flow from the venturis to the cylinder is restricted to the other of said passages except during operation of the engine at high speed of rotation under heavy load to enable strong swirls to be developed in the cylinder even at low intake flows.

2. An internal combustion engine according to claim 1, said control means including a passage having a port opening to the throat of said one of said venturis, a vacuum servo connnected to said last-named passage and energizable upon receipt of a vacuum signal therethrough, lever means operatively connected between said vacuum servo and said valve for opening the valve by said servo, and spring means normally biasing said valve to a position closing said one of said passages.

3. An internal combustion engine according to claim 2, said passage of the control means having a second port opening to the other venturi at its throat.

4. An internal combustion engine according to claim 3, including a pair of throttle valves located downstream of said venturis, respectively, one of said throttle valves being connected to said lever means so as to be actuatable upon energization of said servo, and said valve being coupled to said lever means through a lost-motion connection whereby said valve can be opened a predetermined interval of time after said one of said throttle valve is opened.

5. An internal combustion engine according to claim 1, further comprising a single intake valve for said cylinder, said intake ports being simultaneously openable and closable by said single intake valve.

6. An internal combustion engine including a duplex carburetor having a primary venturi, a primary throttle valve for controlling air flow through said primary venturi, a secondary venturi, and a secondary throttle valve for controlling air flow through said secondary venturi, said secondary throttle valve being closed during operation of the engine at low speed of rotation under light load; a cylinder; and an intake manifold connected between the duplex carburetor and the cylinder, wherein the improvement comprises:

said intake manifold including a chamber located downstream of and communicating with both of said venturis, a primary intake passage branched from said chamber and having a primary intake port opening to said cylinder, and a secondary intake passage branched from said chamber and having a secondary intake port opening to said cylinder;

a control valve positioned to normally close said secondary intake passage; and control means responsive to a vacuum signal from said secondary venturi to open said control valve only during operation of the engine at high speed of rotation under heavy load, whereby the flow from the venturis to the cylinder is restricted to the primary intake passage except during operation of the engine at high speed of rotation under heavy load to enable strong swirls to be developed in the cylinder even at low intake flows.

7. An internal combustion engine according to claim 6, wherein the primary intake port of said primary intake passage is shaped so as to form a swirling flow in said cylinder.

8. An internal combustion engine according to claim 6, wherein the cross-sectional flow area of said primary intake port is approximately from ten percent to twenty percent of that of said secondary intake port.

* * * * *